United States Patent [19]

Kaelin

[11] 3,796,417

[45] Mar. 12, 1974

[54] AERATION APPARATUS FOR LIQUIDS

[76] Inventor: Joseph Richard Kaelin, Villa Seeburg, Buochs, Switzerland

[22] Filed: Feb. 24, 1972

[21] Appl. No.: 228,839

[30] Foreign Application Priority Data
Mar. 1, 1971 Switzerland.................... 2938/71

[52] U.S. Cl..................... 261/93, 210/219, 210/221
[51] Int. Cl.............................................. B01f 3/04
[58] Field of Search .......... 210/221, 197, 219, 220; 261/87, 93, 84, 91, 120, 121, 126

[56] References Cited
UNITED STATES PATENTS

| | | | |
|---|---|---|---|
| 3,053,390 | 9/1962 | Wood............................ | 210/221 X |
| 2,713,477 | 7/1955 | Daman............................. | 261/87 |
| 3,682,313 | 8/1972 | Abraham et al................ | 210/197 X |

*Primary Examiner*—Samih N. Zaharna
*Assistant Examiner*—Robert H. Spitzer
*Attorney, Agent, or Firm*—McGlew and Tuttle

[57] ABSTRACT

An aeration apparatus for liquids comprises a driven aeration impeller with axial intake and radial discharge and having a substantially vertically disposed axis. The aeration impeller comprises two suction sides arranged above one another and working in opposed directions. Guide channel means connect each suction side with the discharge sides of the aeration impeller, and there is provided conduit means for at least one of the guide channel means for the infeed of an aeration medium.

The operation of the above aeration apparatus comprises the steps of arranging the aeration impeller in an aeration tank having a subsequently arranged settling tank of a sewage purification plant, and delivering activated sludge from the settling tank to one suction side of the aeration impeller.

11 Claims, 2 Drawing Figures

AERATION APPARATUS FOR LIQUIDS

BACKGROUND OF THE INVENTION

The present invention relates to a new and improved aeration apparatus for liquids which is of the type embodying a driven vertical axis aeration impeller or gyroscope with axial suction intake and radial ejection or discharge.

The known apparatus of this type, in constrast to the compressed air-aeration apparatuses, are so-called surface aerators. With these constructions the aerator impeller is arranged approximately at the height of the level of the liquid to be aerated, the suction side of the impeller being immersed. With the heretofore known constructions the discharge side is arranged above the liquid level. The mode of operation of the state-of-the-art apparatuses is predicated upon the principle of ejecting the sucked-up liquid above the level of the liquid, sometimes after previously passing an aeration medium through the liquid during its passage through the aeration impeller. As a result the ejected or discharged liquid is finely distributed in intimate contact with the ambient air and thereafter, saturated with air, this liquid then drops back onto the liquid level in order to again be returned into the liquid circulation system.

Notwithstanding relatively favorable infeed efficiencies for such prior art equipment the latter are still associated with certain drawbacks which may be considered as follows:

At ambient temperatures below the freezing point ice tends to form or build-up at the aeration impeller which owing to inbalance of the system generally requires an immediate shut-down of the impeller. This not only brings with it the drawback that the aeration process is interrupted, but furthermore there can arise an immediate freezing of the surface of the liquid, rendering impossible any further surface aeration.

Additionally, the heretofore known surface aerators operate with considerable noise. Moreover, the "depth effect" of the prior art surface aerators is limited, even if a riser or ascending conduit is associated with the suction side thereof. Consequently, such surface aerators can be employed only in relatively shallow containers or vessels if value is placed upon realizing an intensive liquid circulation.

Finally, there is still to be mentioned a further characteristic of the heretofore known surface aerators. As already mentioned the prior art aerator impellers elevate the liquid. The lifting work is realized by the drive which, however, also subjects the impeller during operation to a vertical downwardly directed reaction force which must be either taken-up by a special mounting of the impeller or compensated by a buoyant or lifting force, for instance by constructing the impeller as a floating body.

While prior art constructions of aeration equipment which operate according to the principle of compressed air aeration are relatively insensitive to the effects of frost still they possess other drawbacks. With the previously mentioned known constructions of apparatus in order to realize satisfactory aeration of the liquid it is necessary to provide aeration containers or tanks having complicated shapes, as well as high output compressed air generating and distribution installations, which in turn is associated with increased erection costs. Additionally, measures have to be undertaken in order to prevent contamination of the discharge locations for the compressed air.

SUMMARY OF THE INVENTION

Hence from what has been discussed above it should be apparent that the technology in this particular art is still in need of aeration equipment for liquids and techniques for the operation thereof which are not associated with the aforementioned drawbacks and limitations of the state-of-the-art equipment. It is therefore a primary objective of the present invention to capably and reliably fulfill the existing need in the art.

Still a further significant object of the present invention relates to a new and improved construction of aerator apparatus for liquids which is not associated with the aforementioned drawbacks of the prior art aeration hardware.

Yet a further significant object of the present invention relates to an improved construction of apparatus of the previously mentioned character which resorts advantageously to the use of the advantages of both the surface aerator as well as the compressed air-aerator equipment without having to take into account the above-discussed drawbacks thereof.

A further significant object of the present invention relates to a new and improved construction of aeration equipment for liquids having an aerator impeller which operates in a completely immersed condition, runs quietly, does not form any appreciable liquid spray, and functions in a manner enabling the depth of the container or vessel to be increased.

Yet a further significant object of the present invention relates to a new and improved aerator for liquids which is relatively economical to manufacture, extremely reliable in operation, not readily subject to breakdown, requires a minimum of servicing and maintenance, and needs less space requirements.

Another extremely important objective of this invention is to design the aeration equipment in such a manner that the aeration impeller is operable in a completely immersed position, bringing with it the notable advantages that there is no impairment of the equipment due to the formation of ice or spray and there is less noise in running the equipment, and further that the reaction forces resulting from operation of the aeration impeller are eliminated or balanced-out.

Now in order to implement these and still further objects of the invention, which will become more readily apparent as the description proceeds, the proposed aeration apparatus is manifested by the features that the aeration impeller embodies two suction sides arranged above one another or in superimposed relation and functioning in opposite directions. Each suction side is connected via guide channel means with the discharge sides. A conduit is provided for at least one of the guide channel means for delivering an aeration medium.

The operation of the aeration apparatus in an aeration basin or tank with a subsequently arranged settling tank of a purification installation is manifested by the features that the one suction side of the aeration impeller has delivered thereto activated sludge from the settling tank.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
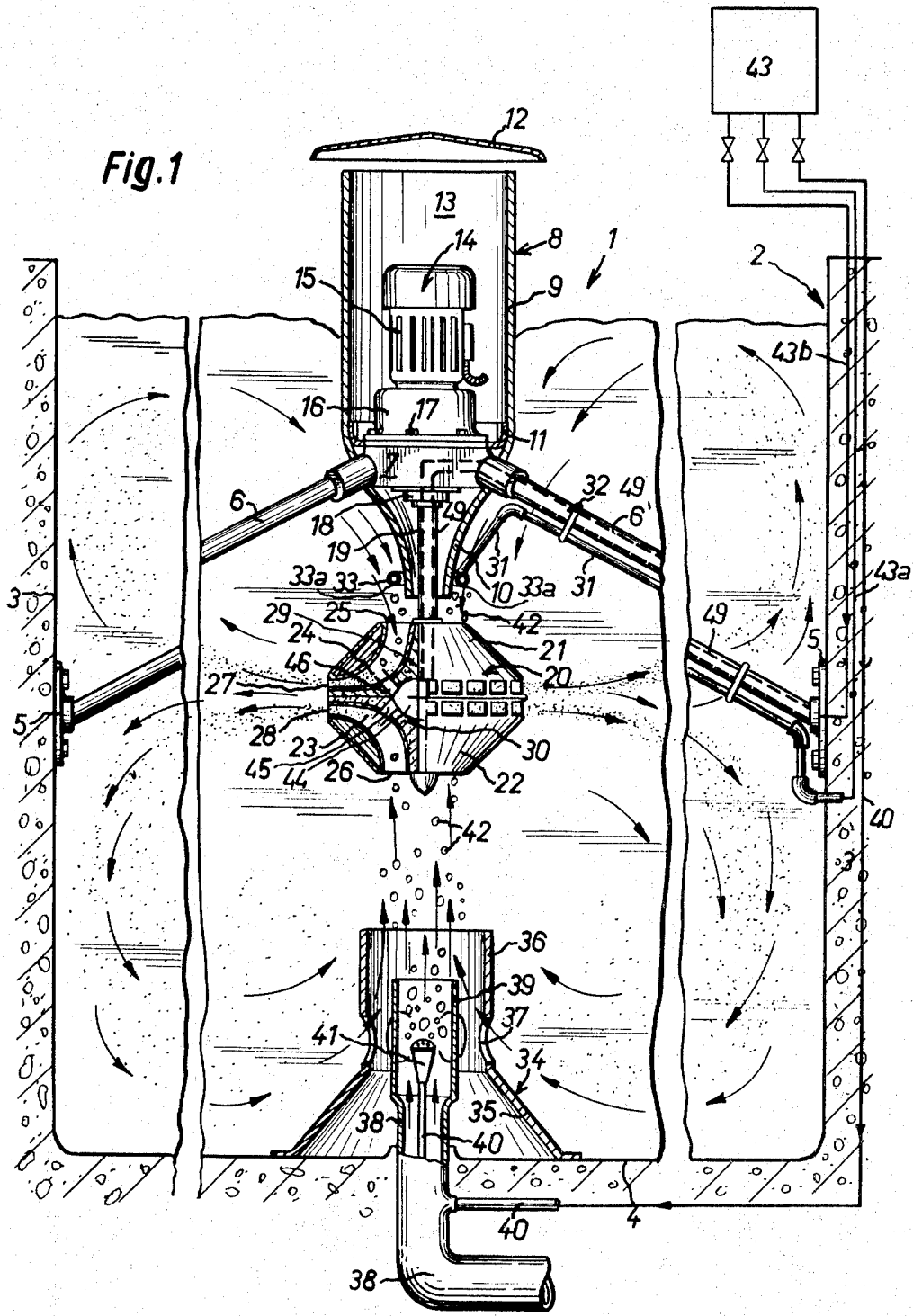
FIG. 1 is a schematic elevational side view of a first embodiment of inventive aeration apparatus arranged in a tank or basin and with a portion of the apparatus structure depicted in sectional view.

Describing now the drawings, and considering initially the exemplary embodiment of inventive aeration apparatus 1 of FIG. 1 there will be recognized a tank or basin 2 having the side walls 3 and a bottom or floor portion 4. This tank or basin 2 can possess any optional configuration in plan. At the side walls 3 of the tank 2 there are anchored in any appropriate manner, such as by suitable fastening means or bolts which have not been particularly referenced, the attachment or connection flanges 5. Secured to the attachment flanges 5 are the upwardly extending struts or rods 6 which carry a centrally arranged platform 7. This platform 7 is enclosed by a substantially bell- or tubular-shaped housing 8 possessing an upper section 9 and a lower tapering or narrowing section 10. This bell-shaped housing 8 is sealingly connected with a profile ring 11 protruding from the periphery of the platform 7, so that the upper, upwardly open housing section or portion 9 which is covered by a cover member 12 encloses a dry compartment or space 13. This compartment 13 houses a geared motor 14 equpped with an encapsulated motor 15 having a vertically extending axis as well as a transmission 16 flanged by means of bolts 17 to the platform 7.

The drive shaft 19 of the transmission 16 piercingly extends downwardly through a bearing support means 18 guided by the platform 7 and also through the lower housing section or portion 10. This drive shaft 19 carries at its lower end an aeration impeller or gyroscope 20 defining a hydrostatic drive body. This aeration impeller 20 is composed of an upper conveying or conveyor wheel 21 and a lower conveying or conveyor wheel 22. These conveying wheels or impellers 21 and 22, which may be identical or similar to one another, are comparable in principle to axial suction take-up and radially discharging pump impellers which are assembled together at the sides facing away from their suction sides 25 and 26, as shown.

For instance, each of the conveying impellers or wheels can be constructed approximately in the manner disclosed and illustrated for the conveying impellers of the Swiss Pat. Nos. 463,409 and 495,293, correspondingly, respectively, to U. S. Pat. Nos. 3,576,316 and 3,610,590, to which reference may be readily had. In this connection it is only further to be mentioned that in the exemplary embodiment under consideration the upper conveying impeller 21 possesses a multiplicity of guide channels 24 which extend from the upper suction side 25 in a uniform curved course towards the peripheral discharge side 27. In like manner the lower conveying impeller or wheel 22 also possesses a multiplicity of guide channels 23 which extend from the lower suction side 26 with a uniform curved course towards the peripheral discharge side 28. The external shape of the aeration impeller 20 corresponds to a double truncated cone, as clearly apparent by referring to FIG. 1.

Continuing, it should be observed that a conduit 31 is connected by clamps 32 with one of the rods or struts 6. This conduit 31 interconnects via a conduit 43a, an air compressor 43 located externally of the tank or basin 2 with a nozzle ring 33 arranged at the region of the upper suction side 25. This nozzle ring 33 possesses a multiplicity of downwardly directed discharge nozzles 33a.

A riser or ascending conduit 34 is secured to the floor 4 of the tank 2 in a position coaxial with the aeration impeller 20. This riser 34 possesses a truncated conical lower section or portion 35 and an upper cylindrical section or portion 36 which is equipped with a multiplicity of throughpassage openings 37.

The upwardly open riser 34 surrounds the vertically extending end 39 of a tubular conduit 38, this end 39 protruding upwardly from the tank floor 4. This tubular conduit 38 communicates with a non-illustrated settling tank arranged after the depicted tank or basin 2 and in the embodiment under consideration serves to return the activated sludge settling at the settling tank to the aeration tank 2.

A further conduit or pipe 40 connected with the air compressor 43 extends into the tubular conduit 38 and within such conduit 38 continues coaxially with respect thereto and at the region of the end 39 of the conduit 38 is equipped with a self-cleaning discharge nozzle 41. The space occupied by the aeration impeller 20, with the exception of the space taken-up by the conveyor impeller channels 23 and 24 and the required walls, is either constructed as a tightly sealed hollow body or provided with a foam filling 29, 30. This is for the purpose of ensuring that the buyoant force acting upon the immersed aeration impeller 20 approximately equals the weight of the impeller.

In this connection it should be mentioned that, with this constructional form of aeration or aerator impeller, an attempt is not being made to compensate the axial reaction forces which occur during operation of the impeller, rather only to render the aeration impeller 20 practically weightless when in its fully immersed condition. Hence the bearings for the shaft 19 do not even experience the load arising by virtue of the weight of the impeller 20.

The axial reaction forces which arise during operation of the aeration impeller 20 tend to almost practically cancel one another by themselves. The upwardly directed reaction force produced during operation of the upper conveying impeller or wheel 21 is opposed by the downwardly directed reaction force produced by the lower conveying wheel or impeller 22. Both of these force components tend to cancel one another provided that the conveying outputs, dependent upon the design of both conveying impellers, approximately equal one another. Hence in the embodiment under consideration there does not appear any appreciable axial load either during standstill or running of the aeration impeller 20.

As will be readily apparent from the drawings the mouth portions defined by the nozzle ring 33 and the discharge nozzle 41 of both air infeed conduits 31 and 40 are arranged at the suction region of both suction sides 25 and 26 of the aeration impeller 20. During operation these conduits 31 and 40 eject relatively large air bubbles 42 which immediately enter the flow to the suction sides 25 and 26, and then are subject, at the channels 23 and 24, with the conveyed liquid to a very large acceleration. This has the result that the large air bubbles 42 are disintegrated into an innumerable number of finer bubbles which are intimately admixed with the conveyed liquid. This ensures an optimum aeration.

Apart from the above the air departing from the nozzle 41 has an additional effect. This effect is comparable to that of a jet pump and brings about an active sucking-up of the activated sludge flowing-in via the conduit 38. The sewage sludge emanating from the pipe end 39 and accelerated by the air bubbles additionally carries out at the riser 34 a further suction action upon the tank contents which then enter the interior of the riser 34 via the openings 37 and thus are immediately admixed with the returned sewage sludge before such liquid enters the suction side 26 of the aerator impeller 20.

Air functioning as an aeration medium is delivered in still a further manner to the aeration impeller 20. Within one of the rods or struts, specifically referenced by numeral 6', there extends a conduit 49 illustrated in broken lines and which is connected via an infeed line 43b with the air compressor 43. This conduit 49 extends through the platform 7 into the interior of the hollow drive shaft 19 and leads to a hollow space or compartment 44 disposed at the central region of the aerator impeller 20.

This hollow compartment 44 is coupled via throughflow openings 45 with the guide channels 23 of the lower conveying impeller or wheel 22 and via throughflow openings 46 with the guide channels 24 of the upper conveying impeller 21.

During rotation of the aeration impeller 20 the liquid in the guide channels 23 and 24 is conveyed from the suction sides 25 and 26 towards the discharge sides 27 and 28 and via the throughflow openings 45 and 46 sucks air out of the hollow compartment 44.

With increasing rotational speed of the aerator impeller 20 the suction effect exerted upon the liquid in the guide channels 23 and 24 increases. The negative pressure which thus prevails at the hollow compartment 44 assists the compressor 43 during the conveying of the air to the hollow compartment 44. Hence with given output of the compressor 43 more air can be conveyed or transported to the channels 23 and 24 than with a stationary air discharge nozzle arranged below the water level.

Figure 2:
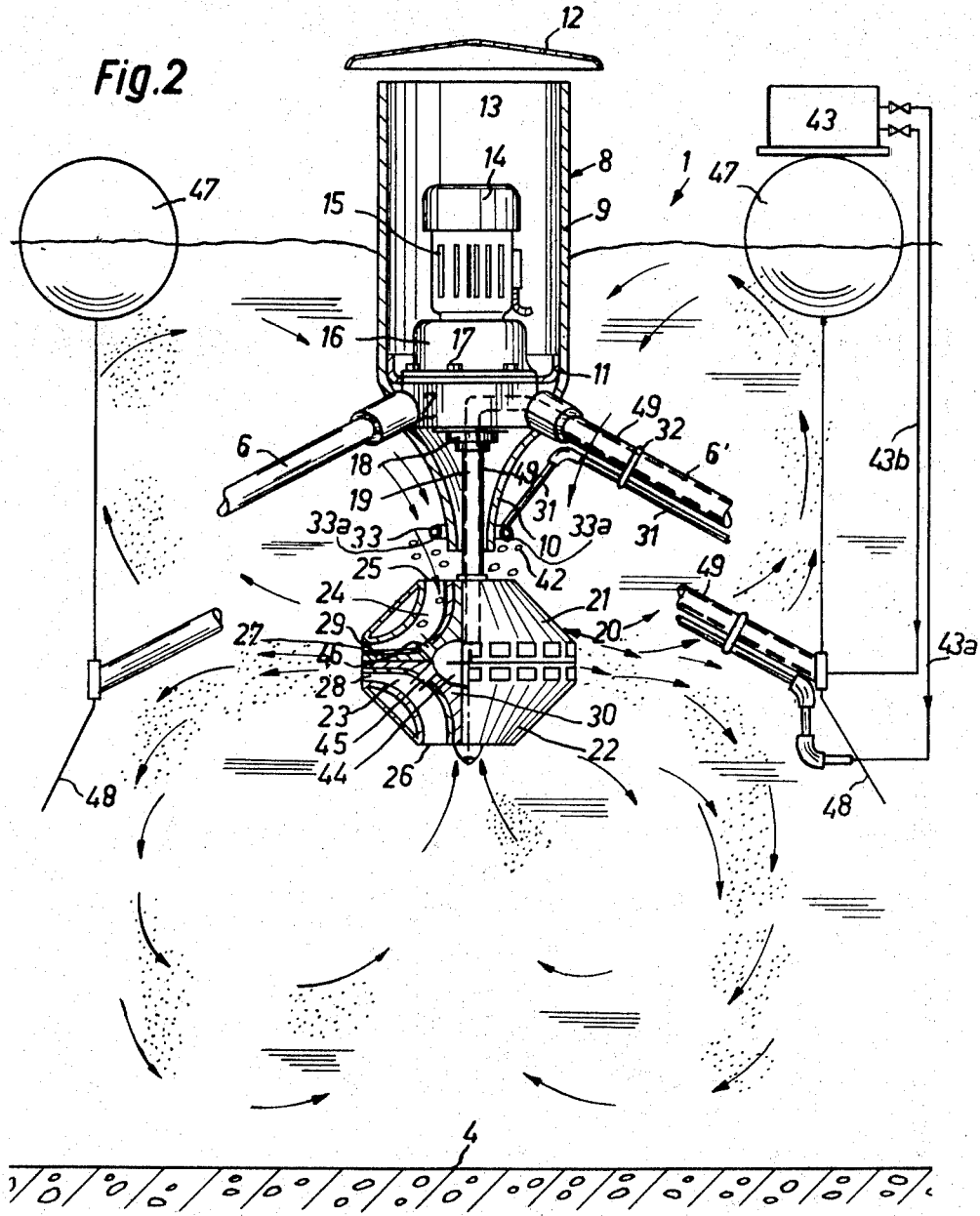
FIG. 2 is a schematic elevational side view of a second embodiment of inventive aeration apparatus arranged in a tank or basin and with a portion of the apparatus structure shown in axial sectional view.

Turning attention now to the variant embodiment of aeration apparatus 1 depicted in FIG. 2 it is to be understood that such essentially corresponds to the construction of the aerator depicted in FIG. 1 so that the same reference characters have been conveniently used to designate the same or analogous components. Now in contrast to the apparatus construction of FIG. 1 with the arrangement of aerator equipment depicted in FIG. 2 there is missing the riser 34 equipped with the tubular conduit 38 and the air conduit 40, which riser, it will be recalled for the embodiment of FIG. 1, was arranged at the floor 4 of the tank or basin 2.

Furthermore, the rods or struts 6 for the embodiment depicted in FIG. 2 are not secured to the side walls 3 of the tank 2, rather are suspended at floats or floating bodies 47. For the purpose of fixing the position of the entire arrangement anchoring cables 48 or equivalent structure are secured to the rods 6, these cables being anchored at their other ends in any suitable fashion.

Now the mode of operation of the aeration apparatus depicted in FIG. 2 corresponds to the mode of operation described in conjunction with the equipment previously discussed in connection with FIG. 1.

As described the aeration medium is delivered to the aerator impeller 20 via the conduit 31 and the nozzle ring 33 and/or via the air conduit 49 arranged internally of a rod 6' and connected with the central hollow compartment 44.

With the presence of the riser or ascending conduit 34 the suction side of the aeration impeller 20 which is directed towards the riser 34 can be additionally supplied with aeration medium via the conduit 40.

The advantages of the illustrated and described embodiments of inventive aeration equipment should be apparent to those skilled in the art. To mention a few, it should be remarked that first of all the aeration impeller 20 itself operates in a completely submerged condition. Hence there is practically not present any noise, and there is not formed any spray mist. On the other hand, there are formed two orderly and intensive circulation currents or streams which allows increasing the depth of the tank or basin. This in turn affords the advantage that for a given tank content and with the same intensive circulation flow the plan area, in other words the space requirements, of the tank can be smaller.

Axial bearing loads practically do not occur with the illustrated embodiments of inventive aeration equipment so that the entire energy employed for the drive beneficially serves to circulate the liquid.

While there is shown and described present preferred embodiments of the invention, it is to be distinctly understood that the invention is not limited thereto but may be otherwise variously embodied and practiced within the scope of the following claims.

What is claimed is:

1. An aeration apparatus for liquids comprising a driven aeration impeller having a substantially vertically disposed axis of rotation and comprising, at its top, an upper suction side and, at its bottom, a lower suction side, said two suction sides being constructed and arranged so that when the impeller is rotated the liquid is sucked in through said sides in opposed axial directions, said aeration impeller further including side discharge means for radially discharging the liquid, a plurality of guide channels for conveying the liquid, said guide channels connecting the suction sides with the side discharge means and being curved, in axial planes of said impeller, to extend from an axial inlet to a radial outlet, and conduit means feeding an aeration medium to said guide channels.

2. The aeration apparatus as defined in claim 1, wherein the weight of the aeration impeller is substantially equal to the weight of the liquid displaced by said impeller.

3. The aeration apparatus as defined in claim 1, wherein said aeration impeller comprises two conveying impellers each possessing a respective one of said suction sides, said conveying impellers being assembled together at the sides thereof facing away from their suction sides.

4. The aeration apparatus as defined in claim 3, wherein said conveying impellers are substantially similar to one another.

5. The aeration apparatus as defined in claim 1, wherein said conduit means for feeding the aeration medium terminates at the suction region of at least one of the suction sides of the aeration impeller.

6. The aeration apparatus as defined in claim 1, wherein said aeration impeller has an internal hollow compartment, means defining throughflow openings for communicating said hollow compartment with said guide channel means, said conduit means for the aeration medium including a conduit opening into said hollow compartment.

7. The aeration apparatus as defined in claim 1, further including drive means for said aeration impeller, an upwardly open substantially bell-shaped housing for accommodating said drive means, said drive means including a drive shaft for said aeration impeller, said drive shaft having an outlet location arranged below the level of the liquid which is to be aerated.

8. An aeration apparatus for liquids comprising a driven aeration impeller with axial intake and radial discharge and having a substantially vertically disposed axis, said aeration impeller comprising two suction sides arranged above one another and constructed so that when the impeller is rotated the liquid is sucked in through said sides, said aeration impeller further including side discharge means, guide channel means for connecting said suction sides with the side discharge means of said aeration impeller, and conduit means for at least one of the guide channel means for the infeed of an aeration medium, said conduit means for infeeding the aeration medium terminates at the suction region of at least one of the suction sides of the aeration impeller, drive means for said aeration impeller, said drive means incorporating a drive shaft, said aeration impeller including an upper suction portion, nozzle ring means surrounding the drive shaft of the aeration impeller and located at the suction region of said upper suction portion of said aeration impeller, said nozzle ring means possessing discharge nozzle means directed towards said upper suction portion of said aeration impeller, said discharge nozzle means being connected with said conduit means for the aeration medium.

9. An aeration apparatus for liquids comprising a driven aeration impeller with axial intake and radial discharge and having a substantially vertically disposed axis, said aeration impeller comprising two suction sides arranged above one another and constructed so that when the impeller is rotated the liquid is sucked in through said sides, said aeration impeller further including side discharge means, guide channel means for connecting said suction sides with the side discharge means of said aeration impeller, and conduit means for at least one of the guide channel means for the infeed of an aeration medium, said conduit means for infeeding the aeration medium terminates at the suction region of at least one of the suction sides of the aeration impeller, a tank for the liquid to be treated within which is arranged said aeration impeller, said aeration impeller incorporating an upper suction portion and a lower suction portion, a stationary riser associated with the lower suction portion of said aeration impeller, said riser being provided with at least one inlet means for the liquid within the tank, and said conduit means for delivering the aeration medium incorporating a conduit having an end portion arranged within said inlet means.

10. An aeration apparatus according to claim 9, including an activated sludge conduit extending upwardly below said riser for the infeed of activated sludge from a settling tank.

11. An apparatus according to claim 10, including a aeration medium conduit located within said sludge conduit for the infeed of aeration medium within said sludge conduit.

* * * * *